Jan. 11, 1955    O. L. VAN STEENIS    2,699,014
METHOD OF MANUFACTURING CATHODE-RAY TUBES COMPRISING
A GLASS CONE AND A GLASS WINDOW
Filed April 23, 1953
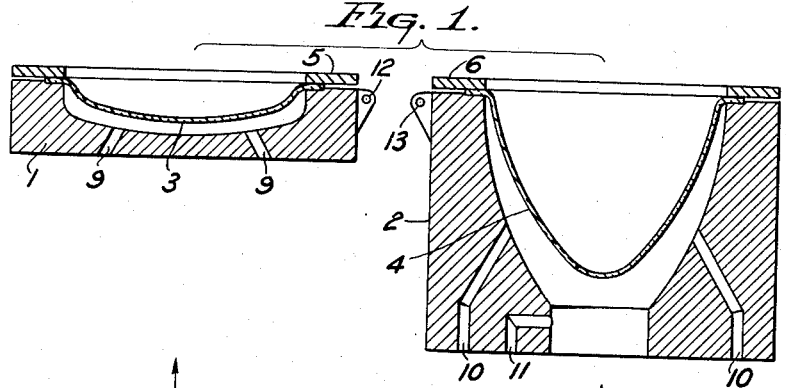
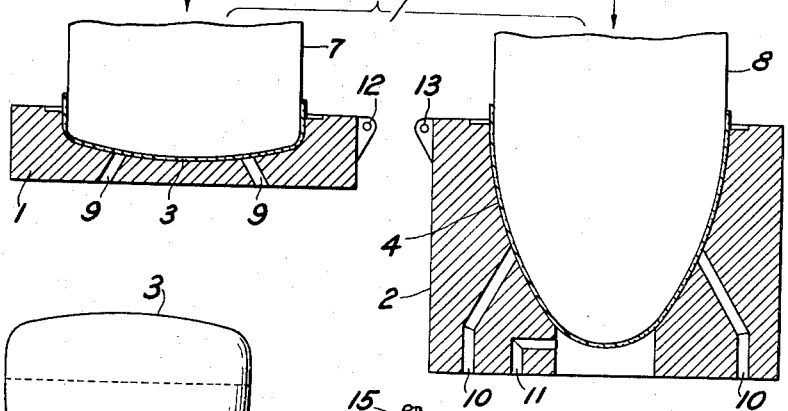
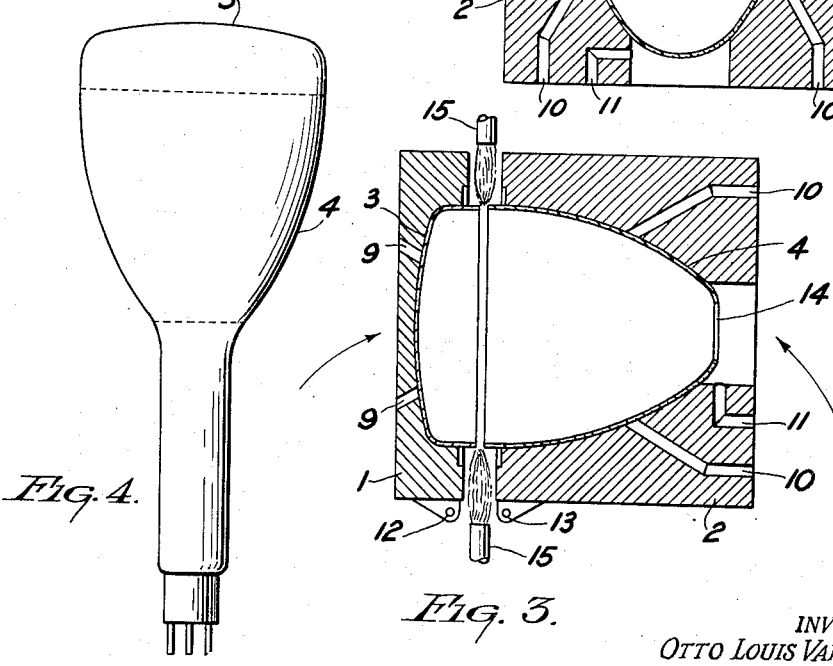
INVENTOR.
OTTO LOUIS VAN STEENIS
BY
AGENT.

United States Patent Office 2,699,014
Patented Jan. 11, 1955

2,699,014

METHOD OF MANUFACTURING CATHODE-RAY TUBES COMPRISING A GLASS CONE AND A GLASS WINDOW

Otto Louis van Steenis, Eindhoven, Netherlands, assignor to Hartford National Bank and Trust Company, Hartford, Conn., as trustee Application April 23, 1953, Serial No. 350,575

Claims priority, application Netherlands May 5, 1952

2 Claims. (Cl. 49—79)

This invention relates to methods of manufacturing cathode-ray tubes comprising a glass cone and a glass window, and more particularly to a method in accordance with which the cone and the window are formed from a flat glass plate.

It is known to place a flat glass plate on a mould, to clamp the edge of the glass and to cause the glass plate, by heating to sink into the cavity of the mould, the glass subsequently being completely pressed into the cavity by means of a die. In this manner it is possible to make a cone and a window having radial flanges adapted to be sealed together.

However, the presence of a projecting glass flange is often disadvantageous, since stresses may readily arise therein during the cooling operation and moreover, the flange increases the diameter of the tube. The method in accordance with the present invention permits of avoiding this disadvantage by providing that, after the glass plate has sunk into the cavity of the mould but prior to introduction of the die, the clamping of the edge of the glass is removed whilst the glass rim is heated with the result that upon introducing the die said glass rim is forced upwards and engages the die, thus obtaining a cone or window without radial flange. The moulds for the window and the cone are advantageously juxtaposed and adapted to be swung upwards after removing the dies, in such manner that the edges of the window and of the cone face each other and may be sealed together. The glass parts may be maintained in the moulds under vacuum. The cone is previously pierced at its narrow end to permit, on sealing the edges, the seal to be slightly forced outwards by admitting compressed air into the cone.

In order that the invention may be readily carried into effect, it will now be described with reference to the accompanying drawing, given by way of example, in which Figs. 1, 2 and 3 show different phases of the method in accordance with the invention, Fig. 4 showing a cathode-ray tube made in accordance with the invention.

In Fig. 1, the mould for the window is denoted by 1, that for the cone by 2. Initially flat glass plates 3 and 4 are placed on the moulds and clamped by means of rings 5 and 6 at their edge. On heating the glass plates 3 and 4 they sag into the cavity of the mould and substantially occupy the position shown in Fig. 1. The sagging is promoted by connecting the ducts 9 and 10 to a vacuum lead. In this case, of course, the remaining apertures at the bottom of the mould 2 must be closed.

After sagging of the glass plates in the aforesaid manner, the clamping rings 5 and 6 are removed, the glass edges are heated and dies 7 and 8 are introduced into the cavities. in this manner the glass parts acquire the correct shape, the edges being forced upwards and engaging the dies. If desired, this may be promoted by exerting pressure from without until the edges closely engage the dies. The dies are subsequently removed, the cone 4 is heated at its narrow end and pierced at 14. After that the moulds are swung upwards, for example about pivots 12 and 13, till the edges of the cone and of the window face each other, as shown in Fig. 3. By evacuating the ducts 9 and 10 the glass parts are maintained in the moulds. Subsequently the moulds are jointly rotated and the edges sealed together by means of burners 15. If the sealing edge tends to sag inwards compressed air may be blown into the duct 11 so that the sealing edge is slightly forced outwards. After cooling, the assembly of cone and window is further processed in the usual manner, the neck being sealed to the narrow part 14 of the cone and the luminescent layer being provided on the window. The finished cathode-ray tube is shaped as shown in Fig. 4, from which it will be seen that there is no radial flange at the transition of window and cone.

What is claimed is:

1. A method of manufacturing cathode-ray tubes comprising the steps of providing a pivotable concave mold for the window and a pivotable concave mold for the cone adjacent said window mold, placing and centering a glass plate over the openings of each of said molds, clamping the edge of each of the glass plates to the edge of its mold, heating the glass to cause the latter to sag part way into the molds, thereafter releasing the edges of the sagged glass plates, heating the edges of the glass plates, pressing a convex die against each of the glass plates to force the latter to engage the walls of its mold and thereby assume its shape and simultaneously to force the heated edges upwardly to engage its die to form, respectively, a window and cone each with cylindrical portions protruding from their respective molds, thereafter removing the dies, thereafter pivoting the molds 90° so that the cylindrical portions of the window and cone face and engage each other, and thereafter heating the cylindrical portions of the window and cone to seal them together.

2. A method of manufacturing cathode-ray tubes, comprising the steps of providing a pivotable concave mold for the window and a pivotable concave mold for the cone adjacent said window mold, placing and centering a glass plate over the openings of each of said molds, clamping the edge of each of the glass plates to the edge of its mold, heating the glass to cause the latter to sag part way into the molds, thereafter releasing the edges of the sagged glass plates, heating the edges of the glass plates, pressing a convex die against each of the glass plates to force the latter to engage the walls of its mold and therey assume its shape and simultaneously to force the heated edges upwardly to engage its die to form, respectively a window and cone each with cylindrical portions protruding from their respective molds, thereafter removing the dies, thereafter heating and piercing the narrow end of the cone, thereafter pivoting the molds 90° so that the cylindrical portions of the window and cone face and engage each other, thereafter evacuating the molds, and thereafter jointly rotating the molds and heating the cylindrical portions of the window and cone to seal them together to form a tube while introducing compressed air into the tube to prevent the cylindrical portions from sagging.

References Cited in the file of this patent

UNITED STATES PATENTS

| 419,441 | Henning | Jan. 14, 1890 |
| 544,248 | Cutler | Aug. 6, 1895 |
| 2,570,309 | Black | Oct. 9, 1951 |

FOREIGN PATENTS

| 654,705 | Great Britain | June 27, 1951 |